(12) United States Patent
Kimes

(10) Patent No.: US 11,280,377 B1
(45) Date of Patent: Mar. 22, 2022

(54) TRANSMISSION ASSEMBLY

(71) Applicant: Sigma Powertrain, Inc., Livonia, MI (US)

(72) Inventor: John W. Kimes, Wayne, MI (US)

(73) Assignee: Sigma Powertrain, Inc., Livonia, MI (US)

(*) Notice: Subject to any disclaimer, the term of this patent is extended or adjusted under 35 U.S.C. 154(b) by 0 days.

(21) Appl. No.: 17/349,988

(22) Filed: Jun. 17, 2021

(51) Int. Cl.
*F16D 48/06* (2006.01)
*F16D 41/16* (2006.01)
*F16H 57/02* (2012.01)
*F16D 48/10* (2006.01)
*F16H 57/04* (2010.01)

(52) U.S. Cl.
CPC ........... *F16D 41/16* (2013.01); *F16D 48/064* (2013.01); *F16H 57/02* (2013.01); *F16D 48/10* (2013.01); *F16D 2300/06* (2013.01); *F16D 2300/18* (2013.01); *F16H 57/043* (2013.01); *F16H 2057/02026* (2013.01); *F16H 2057/02034* (2013.01); *F16H 2057/02043* (2013.01)

(58) Field of Classification Search
CPC ........ F16D 41/16; F16D 48/064; F16D 57/02; F16D 48/10; F16D 2300/06; F16D 2300/18; F16H 57/043; F16H 2057/02026; F16H 2057/02034; F16H 2057/02043

See application file for complete search history.

(56) References Cited

U.S. PATENT DOCUMENTS

| 9,255,614 | B2 | 2/2016 | Kimes | |
|---|---|---|---|---|
| 9,562,574 | B2 | 2/2017 | Kimes | |
| 9,732,809 | B2* | 8/2017 | Niemiec | F16D 27/10 |
| 11,078,969 | B2* | 8/2021 | Cioc | F16D 41/14 |

* cited by examiner

Primary Examiner — David J Hlavka
(74) Attorney, Agent, or Firm — Simonelli IP, PLLC

(57) ABSTRACT

A transmission case houses a plurality of coupling elements and a plurality of gears therein. Each of the plurality of coupling elements may be controllable by at least one of a plurality of actuators and at least one of a plurality of struts. Actuator pads and strut pockets are formed into opposing sides of at least one side wall of the transmission case. The side wall is strong enough to receive the forces created by the strut engaging the coupling elements, while eliminating the need for an extra coupling member that otherwise extends between the transmission housing side wall and the notch plate.

15 Claims, 8 Drawing Sheets

TRANSMISSION ASSEMBLY

BACKGROUND ART

1. Field of the Invention

The invention relates to a transmission assembly. More particularly, the invention relates to transmission assembly coupling devices.

2. Description of the Related Art

All electric, hybrid electric, and plug-in hybrid electric vehicles (collectively referred to as EVs) have a powertrain to transfer power from various power generators to the driven wheels of the vehicle. Traditional transmissions utilize hydraulics and friction to operate. These two performance principles work well in the traditional transmission when powered by an internal combustion engine. The physics of these traditional transmission result in extreme amounts of energy waste, preventing their incorporation into EVs due to the limitations on range these losses create.

U.S. Pat. No. 9,562,574 discloses two versions of a controllable coupling assembly. The controllable coupling assembly uses a solenoid to couple a rotating member to a non-rotating member (ground). The solenoid pivots a locking member or strut into engagement with the rotating member to prevent it from rotating. In one embodiment, the locking member pivots about a portion of the solenoid case. The solenoid case cannot withstand the forces generated by the locking member. The second embodiment introduces an additional coupling member that houses the locking members. While the additional coupling member is designed to withstand the forces generated by the locking member engaging the rotating member, the additional coupling member adds design complexities, weight, inventory, and manufacturing costs, and increases assembly cycle times.

SUMMARY OF THE INVENTION

A transmission case houses a plurality of coupling elements and a plurality of gears therein. Each of the plurality of coupling elements is controllable by at least one of a plurality of actuators and at least one of a plurality of struts. The transmission case includes a clutch housing that houses the plurality of coupling elements. The clutch housing includes a motor mounting base defining a base periphery and at least one side wall extending out from said motor mounting base at the base periphery. The at least one side wall defines an interior surface and an exterior surface. An extension housing covers a plurality of gears. The extension housing is fixedly secured to the clutch housing. At least one actuator mounting pad is formed on the exterior surface of the at least one side wall. Each of the plurality of actuator mounting pads receives each of the plurality of actuators, respectively. A plurality of strut pockets are formed in the interior surface of the at least one side wall. Each of the plurality of strut pockets receives each of the plurality of struts therein.

BRIEF DESCRIPTION OF THE DRAWINGS

Advantages will be readily appreciated as the same becomes better understood by reference to the following detailed description when considered in connection with the accompanying drawings, wherein.

DETAILED DESCRIPTION OF THE DRAWINGS

Figure 1:
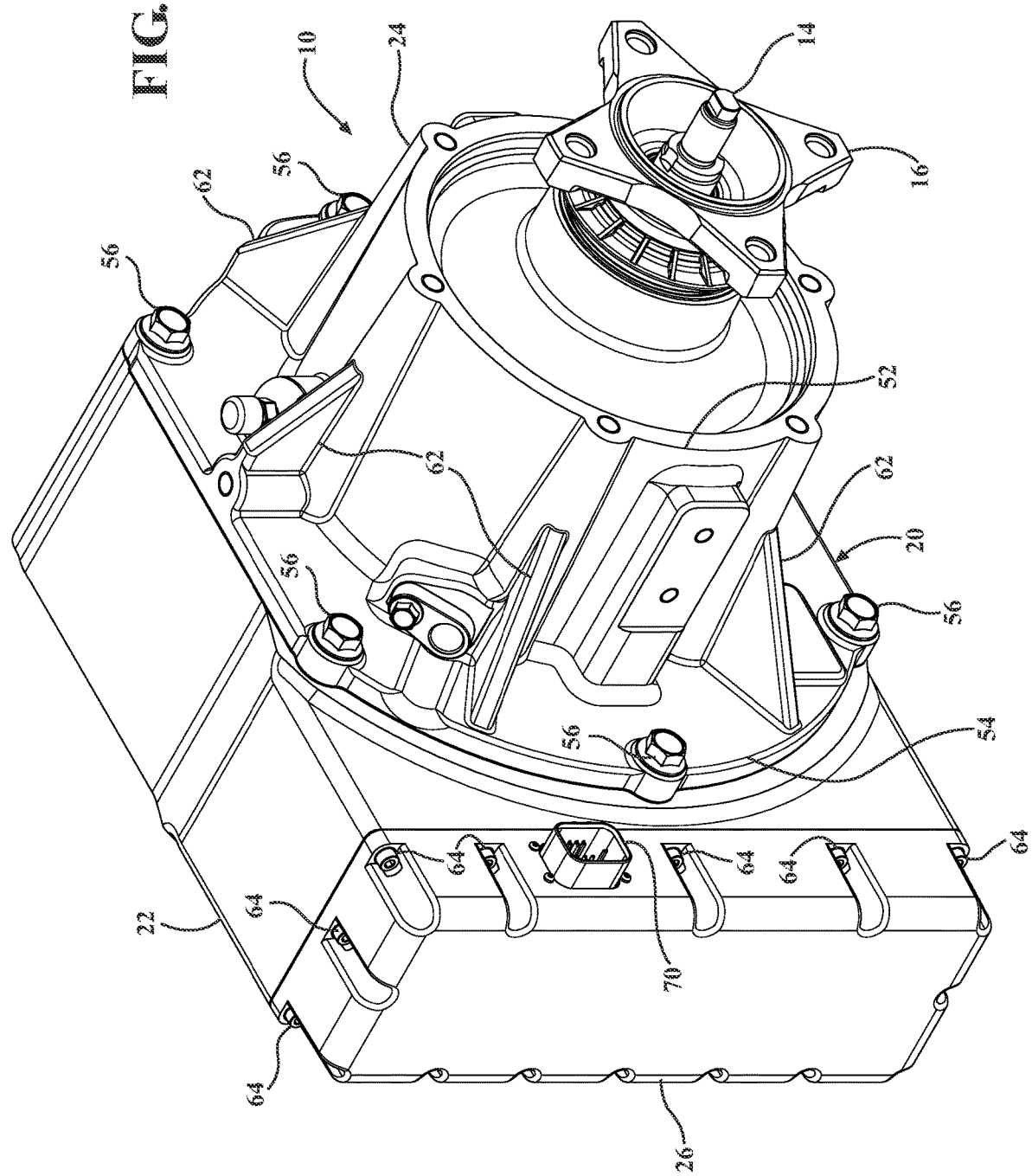
FIG. 1 is a perspective view of one embodiment of a transmission assembly.

Referring to FIG. 1, a transmission assembly is generally indicated at 10. The transmission assembly 10 receives torque from a motive force generator (not shown), typically an electric motor or an internal combustion engine, and translates the torque received into a torque output. The torque output may be same as the torque received or it may be different than the torque received. The transmission 10 is capable of reversing the torque and selectively changing the magnitude of the torque output. While the transmission assembly 10 is contemplated for use in the motor vehicle environment, it is conceivable that the transmission assembly 10 could be used in aircraft, watercraft or in a stationary setting.

Figure 2:
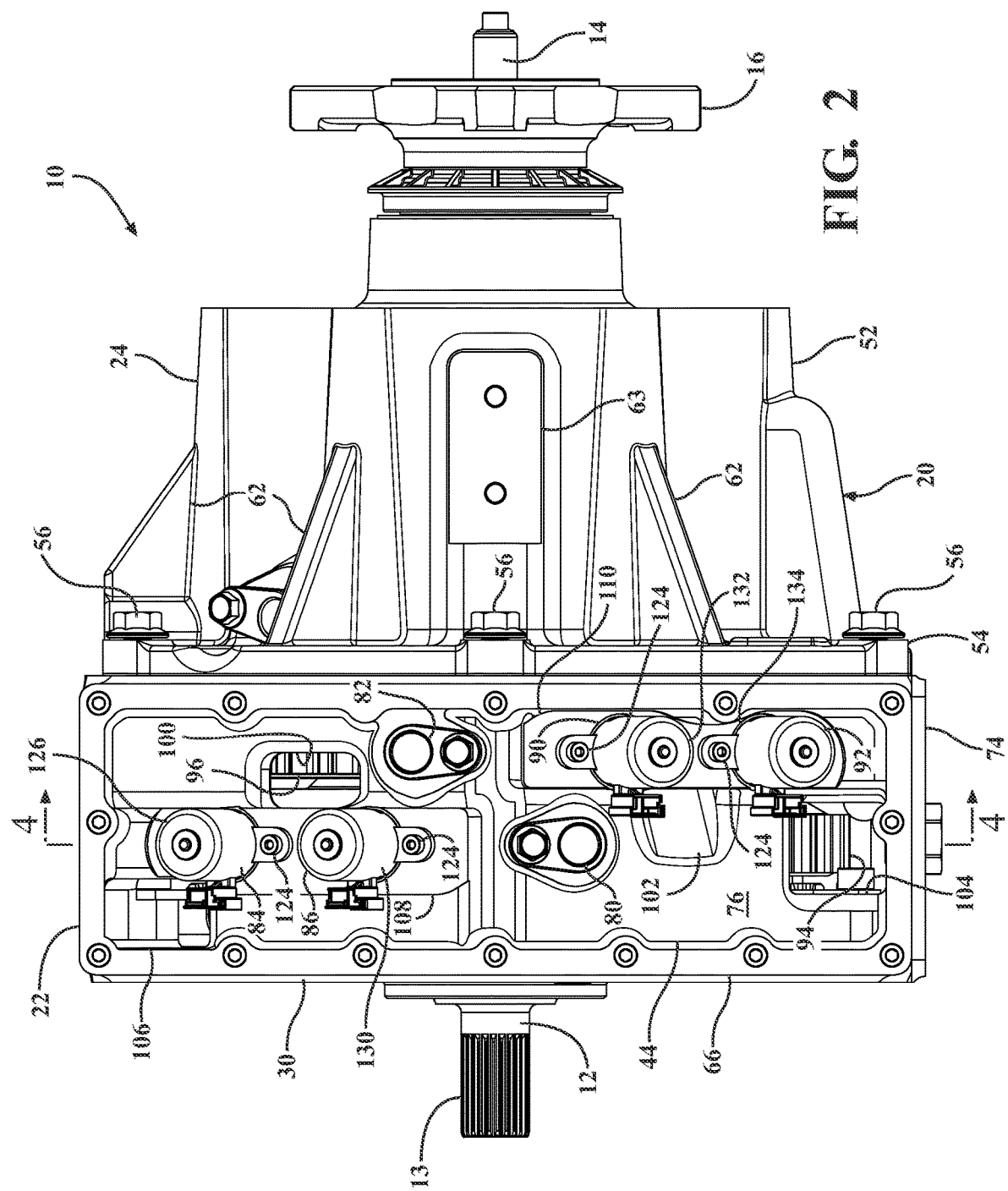
FIG. 2 is a side view of the embodiment shown in FIG. 1 with a control housing and transmission control circuit removed.
Figure 3:
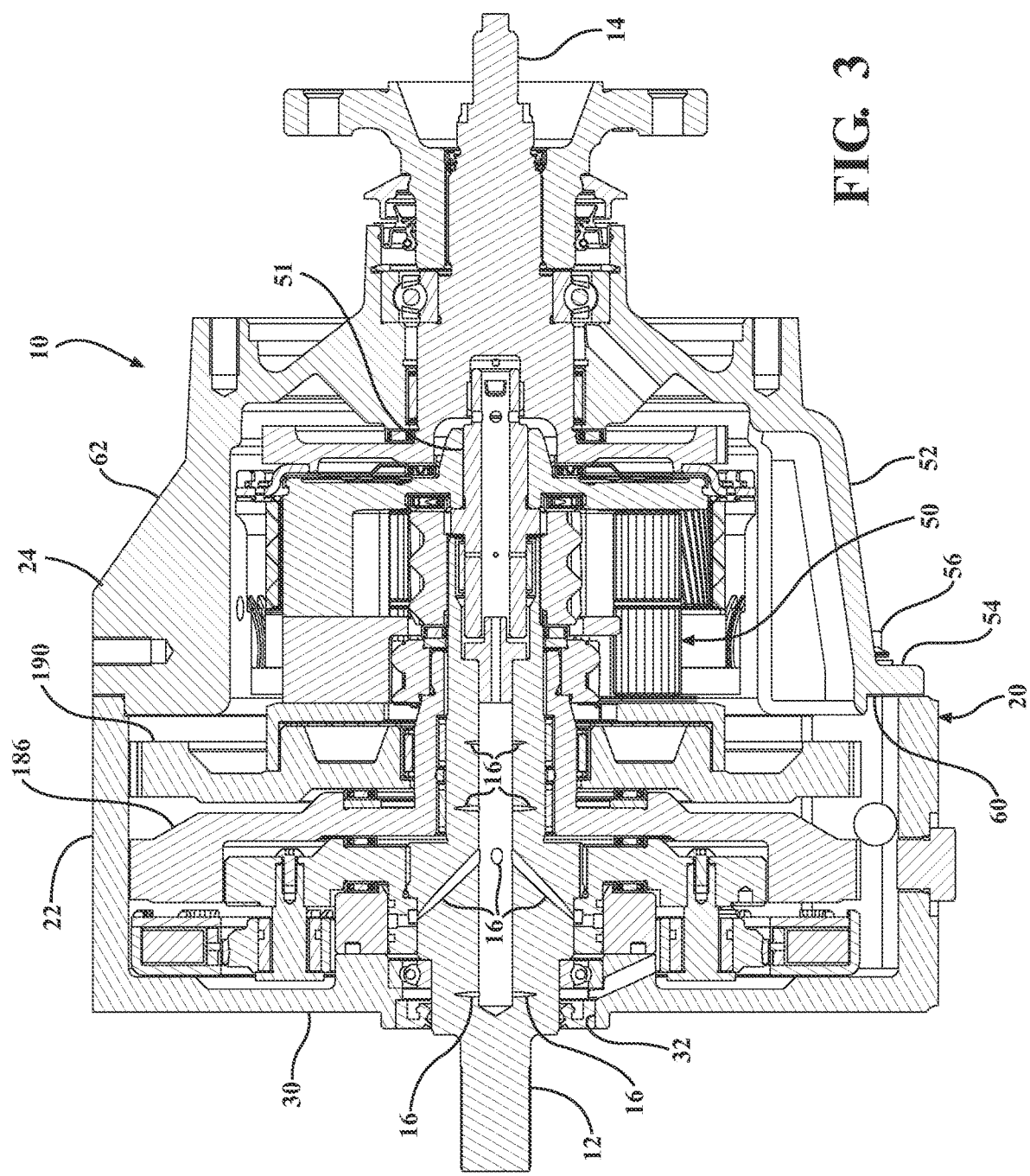
FIG. 3 is a cross-sectional side view of the transmission assembly shown in FIG. 1.

The transmission assembly 10 receives the torque received from an input shaft 12 (best seen in FIGS. 2 and 3). While the input shaft 12 is shown to have a spline 13, it should be appreciated that any mechanism to eliminate lost motion may be incorporated into the input shaft 12. The input shaft also includes lube channels 16 that assist in transmission of lubricant throughout the transmission assembly 10. The torque output exits the transmission assembly 10 through the output shaft 14. An output adapter 18 is secured to the output shaft 14, the design of which is based entirely on the environment into which the transmission assembly 10 is being used.

The transmission assembly 10 includes a transmission case, generally shown at 20. The transmission case 20 houses the parts of the transmission assembly 10 but for the visible ends of the input 12 and output 14 shafts (and the output adapter 18 if used for a particular application). The transmission case 20 is made up of a clutch housing 22, an extension housing 24 and a control cover 26.

The clutch housing 22 is generally rectangular in shape, although the exterior shape of the clutch housing 22 is more of a convenience. The clutch housing 22 houses a plurality of coupling elements that will be discussed in greater detail subsequently. The clutch housing 22 includes a motor mounting base 30. The motor mounting base 30 defines an input shaft opening 32 for the input shaft 12. The motor mounting base 30 defines a generally circular base periphery 34. Portions 36 of the clutch housing 22 extend beyond the base periphery 34, and will be discussed in greater detail subsequently.

At least one side wall 40 extends out from the motor mounting base 30 at the base periphery 34. The at least one side wall 40 defines an interior surface 42 and an exterior surface 44. These surfaces 42, 44 share the same shape. More specifically, the interior surface 42 is generally cylindrical in shape whereas the exterior surface is generally cuboid in shape. The at least one side wall 40 defines a primary opening 46 into which the plurality of coupling elements are positioned.

The extension housing 24 is fixedly secured to the clutch housing 22. The extension housing 24 houses a plurality of gears that combine to create a gearset, generally indicated at 50. While the gearset 50 shown is a Ravigneaux gearset (with an added spacer 51 due to the fact that it is a three-speed Ravigneaux gearset), it should be appreciated by those skilled in the art that the transmission assembly 10 may utilize any gearset 50 required to accomplish the desired function for which the transmission assembly 10 is being designed.

The extension housing 24 includes an extension sidewall 52 that may be cylindrical or frustoconical in shape. A housing flange 54 extends radially outwardly from one end of the extension sidewall 52. Bolts 56 and a gasket 60 seal the extension housing 24 to the clutch housing 22. Fins 62 extend between the extension sidewall 52 and the housing flange 54 to provide additional support to the extension housing 24. A mounting pad 63 provides a surface to which a device may be secured, depending on the overall vehicular design into which the transmission assembly 10 is being placed.

The control cover 26 is secured to the clutch housing 22 with fasteners 64 and a gasket 66. The control cover 26 also includes an electronics plug 70. The electronics plug 70 provides power to the transmission assembly 10 and bilateral communication between a transmission control circuit 72 of the transmission assembly 10 and an engine control unit (not shown).

Referring to FIG. 2, the transmission assembly 10 is shown with the control cover 26 and the transmission control circuit 72 removed. The clutch housing 22 defines a control compartment wall 74 that extends out from the exterior surface 44 of the at least one side wall 40. The control compartment wall 74, in combination with the control cover 26 create a control compartment 76. The control compartment 76 is where the transmission control circuit 72 is located. Also located in the control compartment 76 are speed sensors 80, 82 and a plurality of actuators 84, 86, 90, 92. In the embodiment shown, one speed sensor 80 and two 84, 86 of the plurality of actuators are associated with a first 94 coupling element, whereas a second speed sensor 82 and the other two 90, 92 of the plurality of actuators are associated with a second 96 coupling element. The two coupling elements 94, 96 are housed within the clutch housing 22, but a portion of each is visible in FIG. 2 due to the access ports 100, 102. The access ports 100, 102 and a drainage ports 104, 106 provide two functions. First, wire harnesses (not shown) may extend between the control compartment 76 and the clutch housing 22. Also, lubricant that may splash into the control compartment 76 may drain through these ports 100, 102, 104, 106.

In one embodiment, each of the plurality of actuators 84, 86, 90, 92 are a solenoid. The solenoid may include a permanent magnet (latching) or may utilize a spring to reset (non-latching). In other embodiments (not shown), the actuators may be motors or other types of linear actuators.

Figure 4:
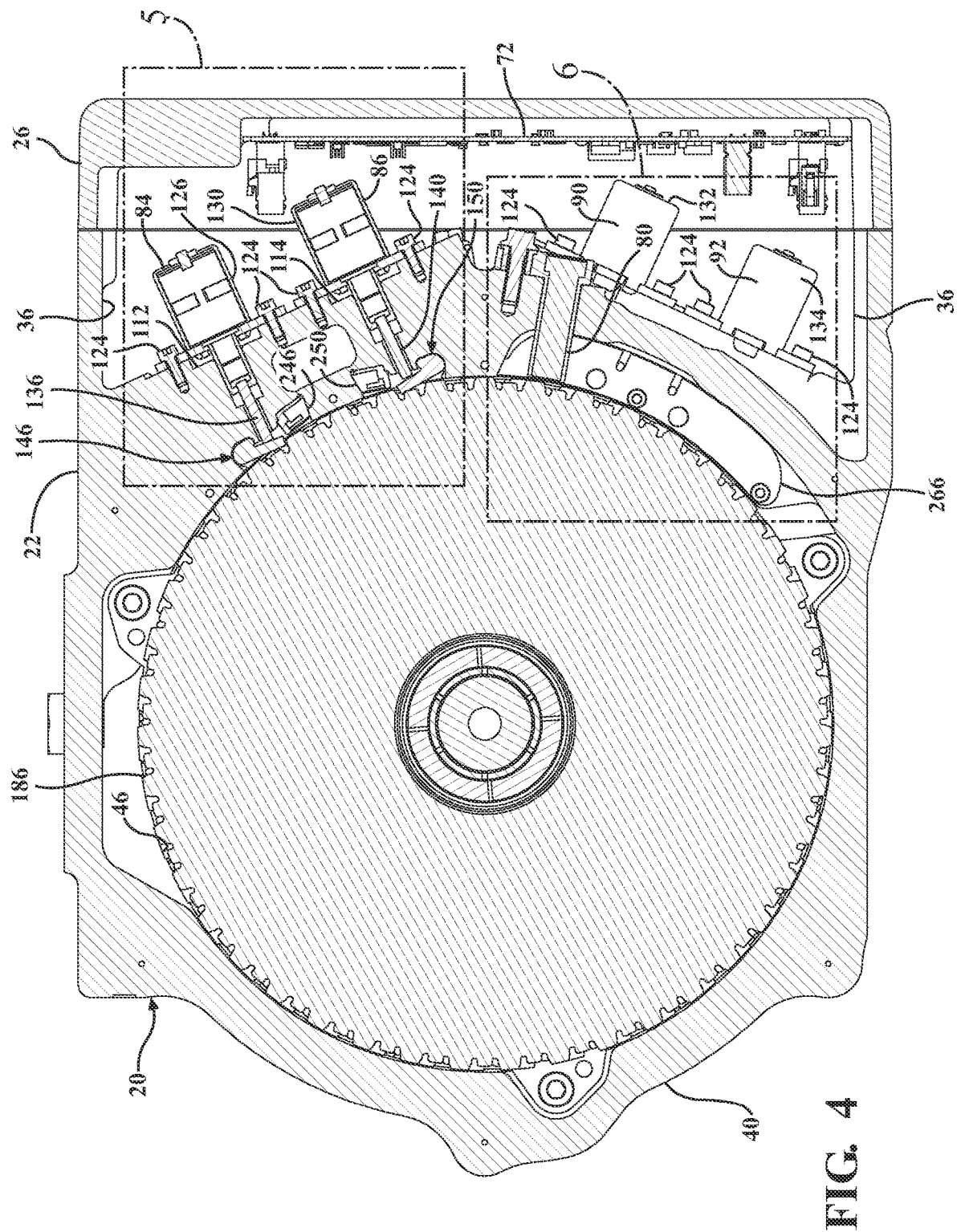
FIG. 4 is a cross-sectional end view taken along lines 4-4 of FIG. 2.
Figure 5:
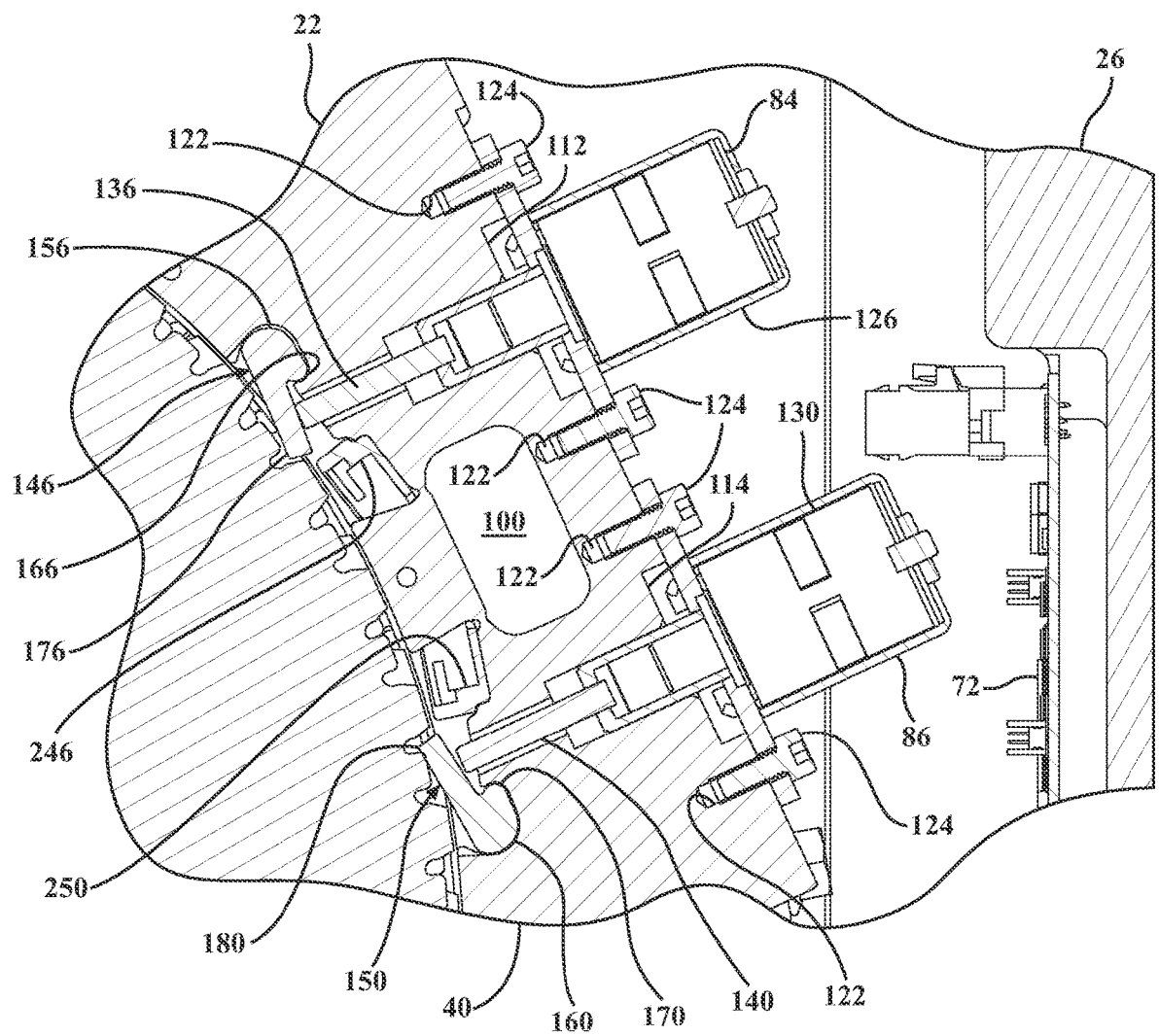
FIG. 5 is an enlarged cross-sectional side view of box 5 in FIG. 4.
Figure 6:
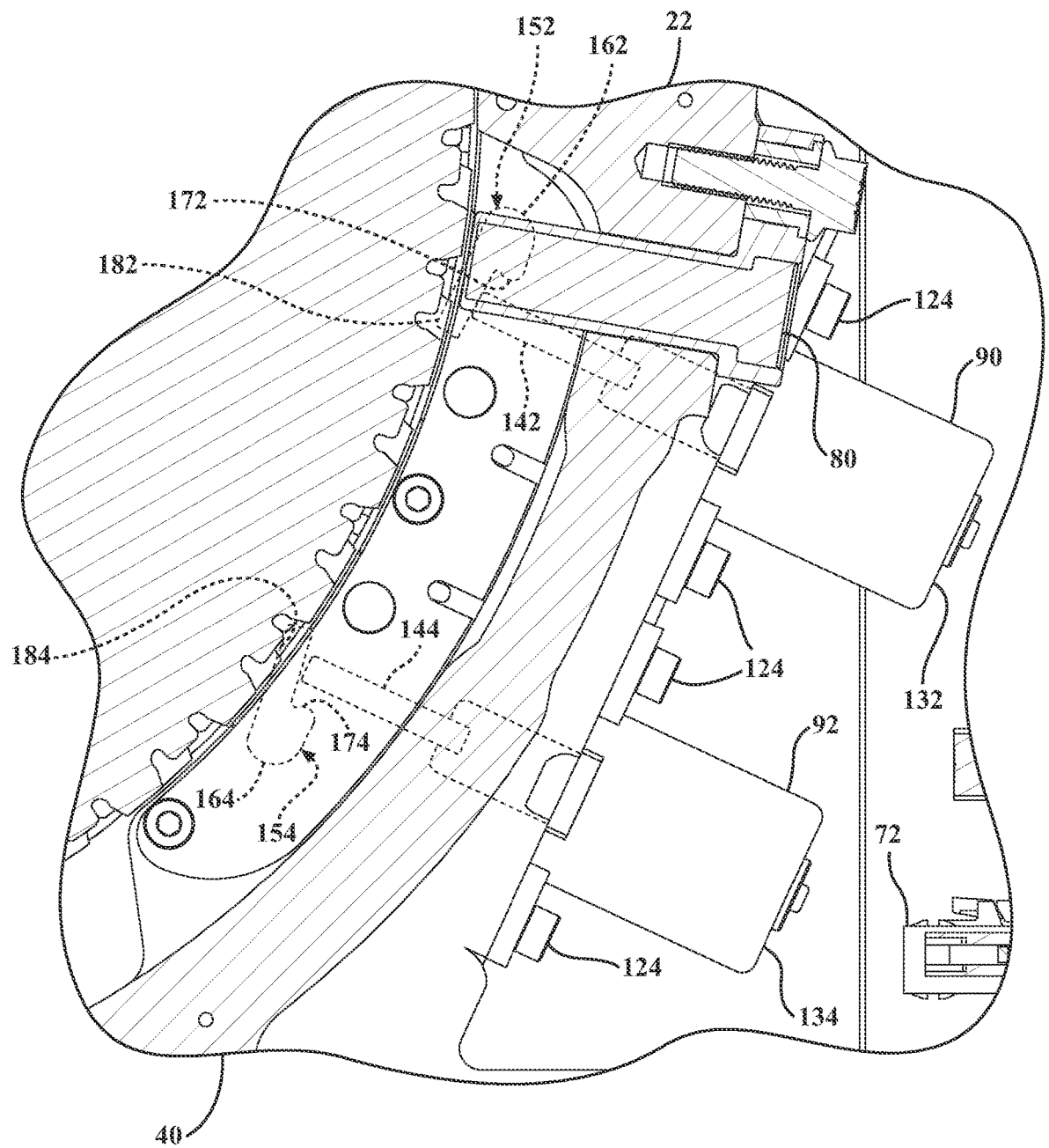
FIG. 6 is an enlarged cross-sectional side view of box 6 in FIG. 4.
Figure 8:
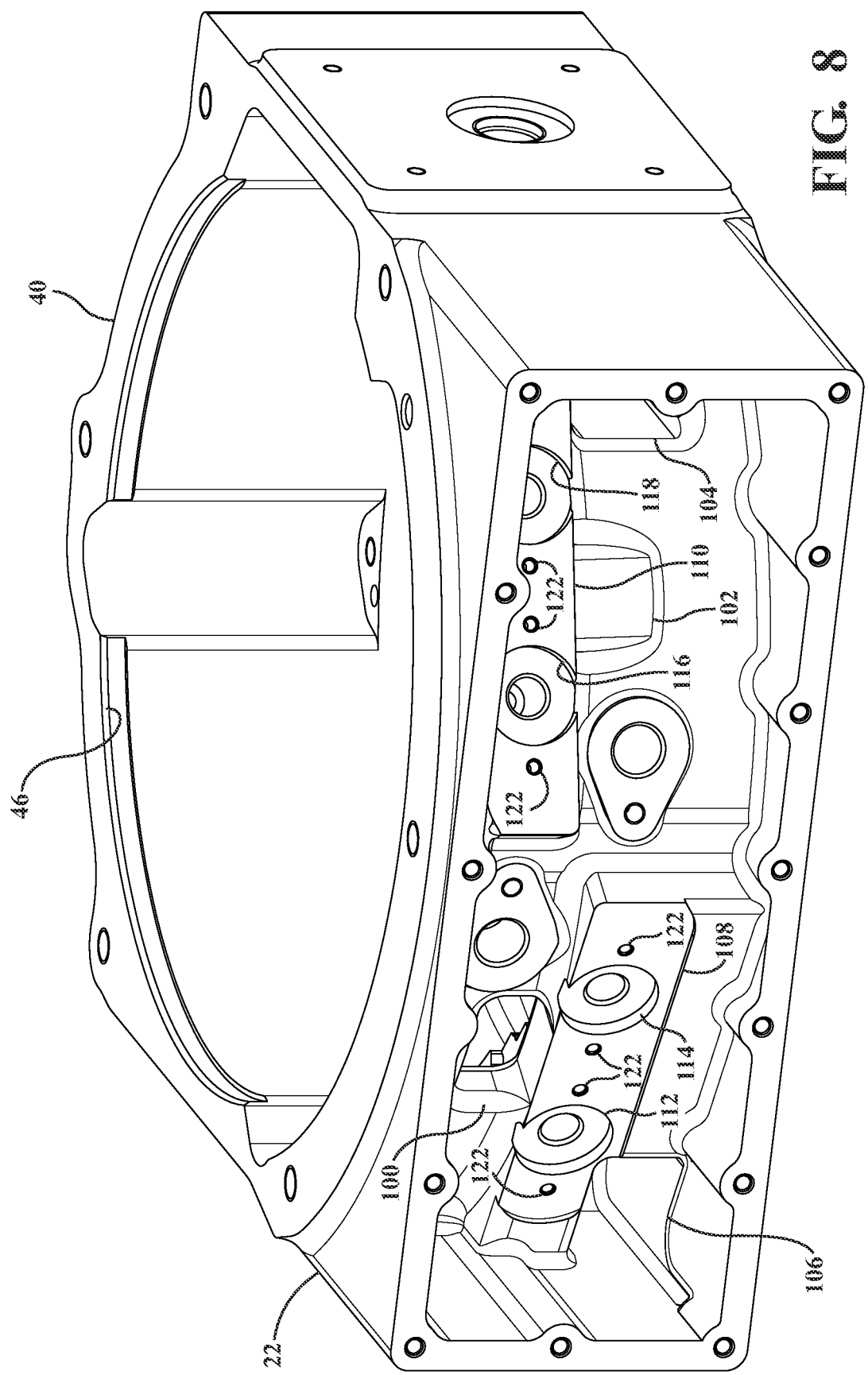
FIG. 8 is a second perspective view of the one embodiment of the clutch housing opposite the view shown in FIG. 7.

Each of the plurality of actuators 84, 86, 90, 92 is fixedly secured to at least one actuator mounting pad 108, 110. The actuator mounting pads 108, 110 extend out of the exterior surface 44 of the at least one side wall 40. The actuator mounting pads 108, 110 may have more than one actuator 84, 86, 90, 92 secured thereto. In the embodiment shown, each of the actuator mounting pads 108, 110 has two of the plurality of actuators 84, 86, 90, 92 secured thereto. The actuator mounting pads 108, 110 provide a flat surface against which each of the plurality of actuators 84, 86, 90, 92 will be secured. The actuator mounting pads 108, 110 may be oriented such that a longitudinal axis of each of the plurality of actuators 84, 86, 90, 92 is a radial extension the coupling element 94, 96 with which they are individually associated. As best seen in FIGS. 4, 5 and 8, the actuator mounting pads 108, 110 include actuator recesses 112, 114, 116, 120 to receive a portion of the actuator 84, 86, 90, 92 therein. Mounting holes 122 receive actuator fasteners 124 therein to secure each of the plurality of actuators 84, 86, 90, 92 to each of the mounting pads 108, 110.

As stated above, each of the plurality of actuators 84, 86, 90, 92 shown in the Figures is a solenoid. The solenoids 84, 86, 90, 92 have a winding (not shown) in a solenoid case 126, 130, 132, 134. The solenoids 84, 86, 90, 92 each have a plunger 136, 140, 142, 144 that move axially along a longitudinal axis of the winding or coil of each of the plurality of actuators 84, 86, 90, 92. Each of the plungers 136, 140, 142, 144 move between a retracted position with at least a portion of the plunger 136, 140, 142, 144 extending into the winding of the solenoid 84, 86, 90, 92, and an extended position with most of the plunger 136, 140, 142, 144 extending out and away from the solenoid 84, 86, 90, 92.

Each of the plungers 136, 140, 142, 144 may engage one of a plurality of struts, generally shown at 146, 150, 152, 154. Each of the plurality of struts 146, 150, 152, 154 defines a heal 156, 160, 162, 164, a toe 166, 170, 172, 174 and an engagement arm 176, 180, 182, 184.

The engagement arms 176, 180, 182, 184 are moved from a retracted position into an engagement position by the plungers 136, 140, 142, 144. When in the engagement position, the engagement arms 176, 180, 182, 184. When in the engagement position, the engagement arms 176, 180, 182, 184 engage one of two notch plates 186, 190. Each of the notch plates 186, 190 have a plurality of teeth 192, 194. Each notch plate 186, 190 is independently controlled by one or both of two struts 146, 150 and 152, 154 that are paired with each of the notch plates 186, 190, respectively. The two struts 146, 150 and 152, 154 mirror each other and allow or prevent rotation of the notch plates 186, 190 in one or both directions, depending on their positioning. In the embodiment shown, one notch plate 186 is for a second gear and a second notch plate 190 is for the carrier of the gearset 50.

Figure 7:
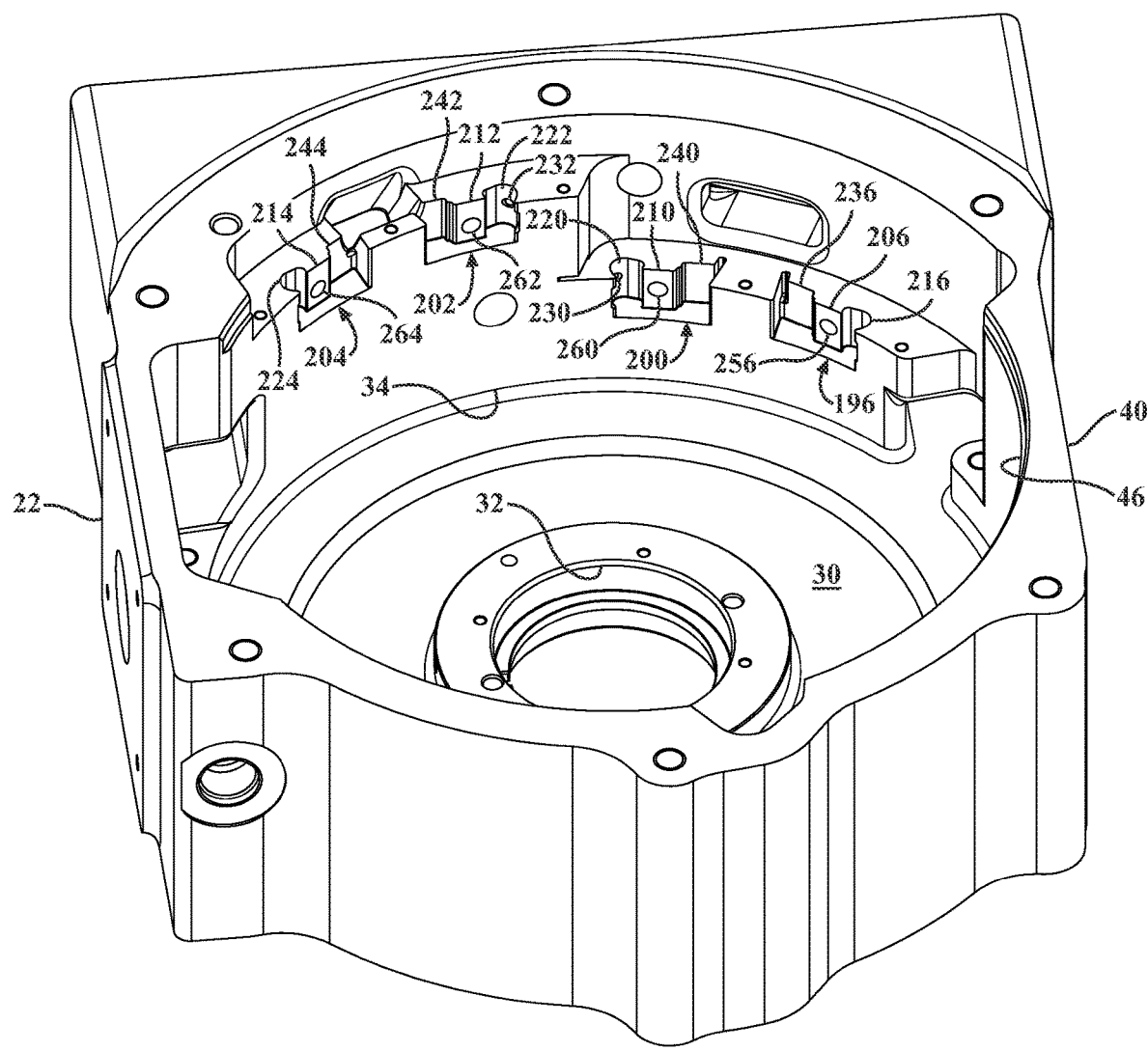
FIG. 7 is a perspective view of one embodiment of the clutch housing.

Referring to FIG. 7, a plurality of strut pockets, generally shown at 196, 200, 202, 204 are formed in the interior surface 42 of the at least one side wall 40. Each of the plurality of strut pockets 196, 200, 202, 204 receives each of the plurality of struts 146, 150, 152, 154 therein. The strut pockets 196, 200, 202, 204 define two planes that match the planes through which the notch plates 186, 190 extend. The strut pockets 196, 200, 202, 204 hold the struts 146, 150, 152, 154 in place and provide the space for the struts 146, 150, 152, 154 to pivot.

Each of the strut pockets 196, 200, 202, 204 define a strut support platform 206, 210, 212, 214. The strut support platforms 206, 210, 212, 214 support the engagement arms 176, 180, 182, 184 of the struts 146, 150, 152, 154 when in the retracted position allowing the respective notch plate 186, 190 to rotate in at least one direction. To one side of the strut support platforms 206, 210, 212, 214 are heal receiving surfaces 216, 220, 222, 224. The heal receiving surfaces 216, 220, 222, 224 receive the heals 156, 160, 162, 164 therein. Each of the heal receiving surfaces 216, 220, 222, 224 has a spring aperture 230, 232 (only two shown in the Figures) that holds a spring therein to bias the struts 146, 150, 152, 154 in the retracted position.

Each of the strut pockets 196, 200, 202, 204 includes a sensor recess 236, 240, 242, 244 disposed adjacent each of the strut support platforms 206, 210, 212, 214 opposite the heal receiving surfaces 216, 220, 222, 224. The sensor recesses 236, 240, 242, 244 each hold a position sensor 246, 250, 252, 254 therein. The position sensors 246, 250, 252, 254 identify the position of the struts 146, 150, 152, 154. Each of the position sensors 246, 250, 252, 254 is either directly or indirectly connected electrically to the transmission control circuit 72, which will prevent the extension of a plunger 136, 140, 142, 144 if the rotational speed of the notch plate 186, 190 associated with the strut 146, 150, 152, 154 is greater than a predetermined speed.

Each of the strut pockets 196, 200, 202, 204 includes a plunger hole 256, 260, 262, 264 that extends through the entire at least one sidewall 40. The plunger holes 256, 260, 262, 264 extend through the strut support platforms 206, 210, 212, 214 giving the plungers 136, 140, 142, 144 access to move the struts 146, 150, 152, 154 into engagement with the notch plates 186, 190, respectively. By forming the strut pockets 196, 200, 202, 204 into the interior surface 42 of the at least one side wall 40, the at least one side wall 40 can support the struts 146, 150, 152, 154 without failure thereof.

Because the strut pockets 196, 200, 202, 204 are formed in the formed in the interior surface 42 of the at least one side wall 40, a separate strut ring is not required. This provides greater clearance in the transmission case 20. As such, the notch plates 186, 190 are required to have a larger diameter, which in turn requires each notch plate 186, 190 to have more notch plate teeth 192, 194, respectively. The increase in the number of teeth 192, 194 provides for increase accuracy with regard to speed and position.

A strut plate 266 is shown covering the struts 152, 154, although each pair of struts 146, 150, 150, 152 is covered by a separate strut plate 266 (only one shown). The strut plates 266 keep the struts 146, 150, 152, 156 and springs in place.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A transmission case for housing a plurality of coupling elements and a plurality of gears therein, wherein each of the plurality of coupling elements is controllable by at least one of a plurality of actuators and at least one of a plurality of struts, said transmission case comprising:
   a clutch housing for covering the plurality of coupling elements, said clutch housing including a motor mounting base defining a base periphery and at least one side wall extending out from said motor mounting base at said base periphery, said at least one side wall defining an interior surface and an exterior surface;
   an extension housing for covering the plurality of gears, said extension housing fixedly secured to said clutch housing;
   at least one actuator mounting pad formed on said exterior surface of said at least one side wall, said at least one actuator mounting pad receiving at least one of said plurality of actuators; and
   a plurality of strut pockets formed in said interior surface of said motor mounting base, each of said plurality of strut pockets receiving one of said plurality of struts therein.

2. A transmission case as set forth in claim 1 wherein each of said plurality of strut pockets includes a strut support platform extending into each of the said plurality of strut pockets to position each of the struts when the struts are retracted therein.

3. A transmission case as set forth in claim 2 wherein each of said plurality of strut pockets includes a heal receiving surface disposed adjacent said strut support platform.

4. A transmission case as set forth in claim 3 wherein each of said plurality of strut pockets includes a sensor recess disposed adjacent said strut support platform opposite said heal receiving surface.

5. A transmission case as set forth in claim 4 including a plurality of actuator mounts extending into said at least one actuator pad to receive each of the plurality of actuators therein.

6. A transmission case as set forth in claim 5 including a plurality of plunger holes, each associated with one of said plurality of actuator mounts, each of said plurality of plunger holes extending through said at least one side wall.

7. A transmission case as set forth in claim 6 wherein each of said plurality of plunger holes extends through one of said plurality of strut support platforms.

8. A transmission assembly comprising:
   a transmission case having an extension housing and a clutch housing, said clutch housing including a motor mounting base defining a base periphery, and at least one side wall extending out from said motor mounting base at said base periphery, said at least one side wall defining an interior surface and an exterior surface;
   an input shaft to receive a rotational torque, said input shaft disposed adjacent said motor mounting base of said clutch housing;
   an output shaft disposed adjacent said extension housing, said output shaft transmitting a second rotational torque out from said transmission case;
   a plurality of coupling elements housed within said transmission case, each of said plurality of coupling elements selectively engageable with said input shaft;
   a plurality of struts engageable with a different one of said plurality of coupling elements to control rotation of each of said plurality of coupling elements;
   a plurality of actuators, each of said plurality of actuators operatively connected to a different one of said plurality of struts such that each of said plurality of actuators moves the different one of said plurality of struts;
   at least one actuator mounting pad formed on said exterior surface of said at least one side wall, said at least one actuator mounting pad receiving at least one of said plurality of actuators; and
   a plurality of strut pockets formed in said interior surface of said motor mounting base, each of said plurality of strut pockets receiving a different one of said plurality of struts therein.

9. A transmission assembly as set forth in claim 8 wherein each of said plurality of strut pockets includes a strut support platform extending into each of the said plurality of strut pockets to position each of said plurality of struts when each of said plurality of struts is retracted therein.

10. A transmission assembly as set forth in claim 9 wherein each of said plurality of strut pockets includes a heal receiving surface disposed adjacent said strut support platform.

11. A transmission assembly as set forth in claim 10 wherein each of said plurality of strut pockets includes a sensor recess disposed adjacent said strut support platform opposite said heal receiving surface.

12. A transmission assembly as set forth in claim 11 including a plurality of actuator mounts extending into said at least one actuator pad to receive each of said plurality of actuators therein.

13. A transmission assembly as set forth in claim 12 including a plurality of plunger holes, each associated with one of said plurality of actuator mounts, each of said plurality of plunger holes extending through said at least one side wall.

14. A transmission assembly as set forth in claim 13 wherein each of said plurality of plunger holes extends through one of said plurality of strut support platforms.

15. A transmission assembly as set forth in claim 14 wherein each of said plurality of struts includes a cam end defining a cam surface that complements each of said heal receiving surfaces.

\* \* \* \* \*